United States Patent [19]

Bruno et al.

[11] Patent Number: 5,242,674

[45] Date of Patent: * Sep. 7, 1993

[54] PROCESS FOR PREPARING CRYSTALLINE MIXED METAL OXIDES

[75] Inventors: Salvatore A. Bruno, Wilmington, Del.; William L. Monson, Chadds Ford, Pa.

[73] Assignee: E. I. Du Pont de Nemours and Company, Wilmington, Del.

[ * ] Notice: The portion of the term of this patent subsequent to Feb. 11, 2009 has been disclaimed.

[21] Appl. No.: 711,969

[22] Filed: Jun. 7, 1991

Related U.S. Application Data

[63] Continuation-in-part of Ser. No. 265,295, Oct. 27, 1988, Pat. No. 5,087,437.

[51] Int. Cl.$^5$ .................. C01G 23/04; C04B 35/46; C04B 35/48; C04B 35/49
[52] U.S. Cl. ............................ 423/593; 423/598; 423/DIG. 15
[58] Field of Search .............. 423/593, 598, DIG. 9, 423/DIG. 15; 501/134, 135, 136, 137, 152

[56] References Cited

U.S. PATENT DOCUMENTS

| | | | |
|---|---|---|---|
| 2,948,628 | 8/1960 | Wainer | 106/39 |
| 3,292,994 | 12/1966 | Kiss | 23/51 |
| 3,413,083 | 11/1968 | Daendliker | 23/24 |
| 3,577,487 | 5/1971 | Gall et al. | 264/56 |
| 3,647,364 | 3/1972 | Mazdiyashi | 23/51 R |
| 3,794,299 | 2/1974 | Wagner et al. | 259/4 |
| 3,796,793 | 3/1974 | Metzer et al. | 423/DIG. 15 |
| 4,636,378 | 1/1987 | Pastor et al. | 501/135 |
| 4,696,810 | 9/1987 | Shirasaki et al. | 423/593 |
| 4,764,493 | 8/1988 | Lilley et al. | 423/598 |
| 4,832,939 | 5/1989 | Menashi et al. | 501/134 |
| 4,863,883 | 9/1989 | Menashi et al. | 501/134 |
| 4,898,843 | 2/1990 | Matsushita et al. | 423/598 |

FOREIGN PATENT DOCUMENTS

| | | | |
|---|---|---|---|
| 79392 | 5/1983 | European Pat. Off. | |
| 0250085 | 12/1987 | European Pat. Off. | 423/598 |
| 1925730 | 11/1969 | Fed. Rep. of Germany | |
| 3438446 | 4/1986 | Fed. Rep. of Germany | |
| 57-82119 | 5/1982 | Japan | |
| 58-198491 | 11/1983 | Japan | |
| 58-199719 | 11/1983 | Japan | |
| 0217429 | 12/1983 | Japan | 423/598 |
| 59-39725 | 3/1984 | Japan | |
| 2166126 | 4/1986 | United Kingdom | |
| 2168334 | 6/1986 | United Kingdom | |

OTHER PUBLICATIONS

"An Aqueous Synthesis of Barium Titanate", by S. Flaschen JACS 77 6194 (1955).
"Preparation of High-Purity Submicron Barium Titanate Powders", by K. S. Mazdiyashi et al., JACS 52, No. 10 (1969).
"Chemical Processing of (Ba,Sr)(Ti,Zr)O$_3$ Perovskite Ceramics", by F. Chaput et al., Journal of Materials Science Letters 6 (1987), pp. 1110–1112.
European Search Report for Application Number EP 89 300,263.

Primary Examiner—Michael Lewis
Assistant Examiner—Steven Bos

[57] ABSTRACT

An improved process for preparing crystalline mixed metal oxides, such as barium titanate, in which an organometallic compound is reacted simultaneously and continuously with a solution of a divalent metal ion in an alkaline high turbulence energy environment, the reaction product is crystallized, and the crystals are isolated and may be calcined.

16 Claims, 5 Drawing Sheets

PROCESS FOR PREPARING CRYSTALLINE MIXED METAL OXIDES

CROSS REFERENCE TO EARLIER FILED APPLICATION

This application is a continuation-in-part of application Ser. No. 07/265,295, filed on Oct. 27, 1988, now U.S. Pat. No. 5,087,437.

BACKGROUND OF THE INVENTION

The present invention relates to an improved process for preparing crystalline mixed metal oxides, and, more particularly, to a process for preparing crystalline mixed metal oxides, such as barium titanate ($BaTiO_3$) of narrow particle size distribution, by simultaneously mixing the respective ingredient streams continuously in a high turbulence energy environment.

Crystalline mixed metal oxides to which this invention relates belong to a class of materials typified in their simplest form by the formula:

$$ABO_3$$

wherein
  A is a divalent metal ion which can be selected from, for example, Ba, Sr, Ca, Mg, Pb and mixtures thereof; and
  B is a quadrivalent ion which can be selected from Ti, Zr, Hf and Sn and mixtures thereof.

These materials can be prepared generally by mixing an organometallic compound or mixture of organometallic compounds or a hydrolyzable system of the general structure $BL_n$, where "B" is Ti, Zr, Nb, Hf, Zn, etc., "L" is a hydrolyzable group, or a combination of such groups, such as alkoxy, aryloxy, aminoalkoxy, acetoxy, acetoacetonyl and the like, and n can be 2, 4, or 5, with aqueous or nonaqueous solutions of compounds of the general structure $AX_y$ where "A" can be selected from Ba, Sr, Ca, Mg, Pb, Nd and Li, and "X" can be selected from such groups as hydroxide, chloride, nitrate or acetate ions, and y can be 1, 2, or 3.

Crystalline mixed metal oxides are a basic material used in multi-layer ceramic capacitors. Their electrical properties depend greatly on controlling the type and amount of impurities present, particle size and particle size distribution, and stoichiometry, i.e., the mole ratio of A component to B component, of the powders from which the ceramic capacitor bodies are formed. The powders made by the process of the present invention can also be used for various other applications such as piezoelectric and semiconductor ceramics, i.e., PTC resistor applications.

Numerous processing techniques have been developed for making metal oxides, e.g., solid state reactions, oxalate route, alkoxide process, in the effort to define the process parameters which can be important to control or influence the desired properties in the end product powder. Since the current trends in the capacitor industry are for thinner dielectric layers and replacement of precious metals with copper, capacitor manufacturers will require powders of uniform fine particle size (i.e., less than about 1.0 μm) and powders with sintering temperatures less than the melting point of copper. In addition to a uniform fine particle size, these powders must be chemically homogeneous. The process of the present invention relates to the alkoxide processing technique, and the following prior art is relevant.

The synthesis of barium titanate by the hydrolysis of titanium alkoxides in hot aqueous barium hydroxide is reported by S. S. Flaschen, J.A.C.S. 77,6194 (1955). Tetra-n-propyl titanate (a dilute propyl alcohol solution) is added to an aqueous solution of $Ba(OH)_2$ at pH 11-14 and 80°-100° C. which yields $BaTiO_3$ of 1-5 μm particle size. The processing environment, e.g., the reaction pH and the concentration of barium hydroxide during the reaction, changes throughout the addition procedure so that titanium which is added to the reaction early in the procedure encounters a different reaction environment than the titanium added later in the procedure. The reaction environment is not uniform and continuous, and a barium titanate product having a uniform, homogeneous fine particle size may not always be produced therefrom. Unlike the Flaschen reference, the process of this invention varies the barium excess to control the BaO to $TiO_2$ molar ratio in the product powder.

U.S. Pat. No. 1,948,628 describes a method for preparing crystalline $BaTiO_3$ of 1-5 μm particle size by mixing an alcoholate of barium with an alcoholate of titanium, hydrolyzing with water, digesting the mixture by boiling, recovering $BaTiO_3$ hydrate, and calcining at 1600° F. to yield $BaTiO_3$ powder. Ball milling the calcine produces $BaTiO_3$ having a particle size of less than 1 μm.

U.S. Pat. No. 3,292,994 describes a modification of the process of Flaschen (JACS 77,6194) by which a very fine (<800A) particle size barium titanate can be produced by adding gross amounts of water soluble oxygen functional compounds, such as isopropyl alcohol, methanol or ethanol, to the barium salt solution. It is well known to those skilled in the art of ceramics that such ultra fine particle size (<800A), high surface area powders, e.g., having surface areas of 12.5 $m^2/g$ and higher, cannot be satisfactorily processed into capacitors.

U.S. Pat. No. 3,647,364 describes a process for producing high purity submicron barium and strontium titanate powders by the hydrolytic decomposition of a barium and strontium alcoholate and a titanium alcoholate. The powders have a particle size in the range of 50-150 angstroms and a purity of 99.75% or higher.

U.S. Pat. No. 4,636,378 describes a low temperature method for preparing perovskite-type compounds, such as barium titanate. The process involves the sequential addition of a B-alkoxide, e.g., titanium iso-butoxide, to a predetermined amount of aqueous A-hydroxide, e.g., barium hydroxide.

None of the published art describes the preparation of mixed metal oxides having all of the following properties:
  A particle size of less than 1.0 μm.
  Particle crystallinity.
  Controlled cation stoichiometry.
  Powder surface areas less than 50 $m^2/g$, and preferably less than 15 $m^2/g$.

SUMMARY OF THE INVENTION

The present invention relates to an improved process for preparing crystalline mixed metal oxides of the formula:

$$ABO_3$$

wherein,

A is a divalent metal ion selected from Ba, Sr, Ca, Mg, Pb and mixtures thereof; and B is a quadrivalent ion selected from Ti, Zr, Hf, Sn and mixtures of, which comprises the steps of:

(a) mixing an organometallic compound, or mixture of organometallic compounds or a hydrolyzable system, of the general structure $BL_n$ where B is as defined above, L is a hydrolyzable group, or combination of such groups, selected from alkoxy, aryloxy, aminoalkoxy, acetoxy, and acetoacetonyl, chlorides, nitrates and acetates, and n is 2 or 4 with a solution of a compound, or a mixture of compounds, of the general structure $AX_y$, where A is as defined above, X is an anion, or a combination of anions, selected from hydroxide, chloride, nitrate and acetate, and y is 2, simultaneously and continuously in an alkaline high turbulence energy environment;

(b) crystallizing the reaction product; and (c) isolating the crystals.

According to the process of this invention, two or more ingredient streams are formed in step (a) which are reacted together by mixing them simultaneously and continuously in a high turbulence energy environment, i.e., in a reaction zone or region which is capable of creating a turbulence intensity, "T", above 9,000,000 as hereinafter defined. This type of procedure can successfully produce uniform compositions with narrow particle size distributions. In addition, it is also possible to consistently produce product powders having the most desirable A/B mole ratios, as hereinafter defined, for further processing into reliable capacitors. The crystalline mixed metal oxides of this invention may also contain dopant or substitution ions to enhance or modify their properties. Dopants substituting in the crystal lattice for A ions are normally selected from:

Trivalent rare earth metal ions, e.g., Nd, denoted for illustration herein as $A^+$; and monovalent alkaline metal ions, e.g., Li, denoted for illustration herein as $A^-$. Dopants substituting in the crystal lattice for B ions are normally selected from:

Pentavalent ions, e.g., Nb, denoted as $B^{30}$; and di- or trivalent ions including Zn and transition metal ions, denoted as $B^-$.

As used and referred to herein, A/B mole ratio is defined as:

$$\frac{N(A) + N(A^+) + N(A^-)}{N(B) + N(B^+) + N(B^-)}$$

where N( ) refers to the number of moles of each type of ion. The process of this invention can consistently produce "pure," i.e., undoped, product powders of crystalline mixed metal oxides having an A/B mole ratio in the range of 0.990–1.010, and doped powders where the A/B mole ratio can range up to about 1.029, which have been recognized as preferred ranges for processing the respective powders into capacitor bodies. Powders having an A/B mole ratio outside of this range may also be produced by the process of this invention, but the capacitor bodies produced from these powders may not have the desired electrical properties or the needed reliability.

A further calcination step may be desirable to produce a powder with a lower surface area while maintaining a narrow particle size distribution.

DETAILED DESCRIPTION OF THE INVENTION

Figure 1:
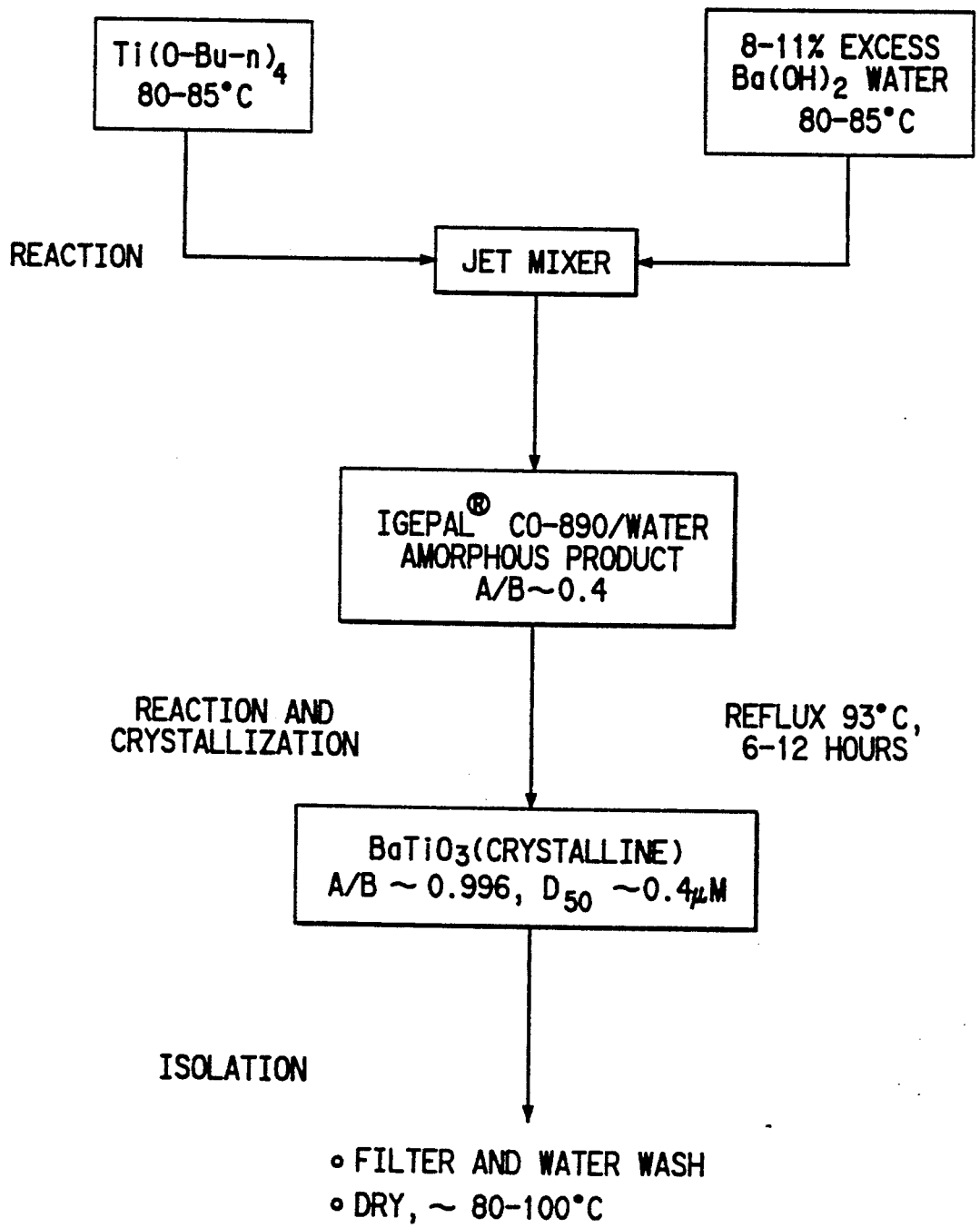
FIG. 1 is a flow diagram for the preparation of barium titanate by the process of this invention.

The present invention relates to the preparation of chemically homogeneous, crystalline, mixed metal oxides of narrow particle size distributions, such as barium titanate and solid solutions, which, when processed into capacitors, impart very desirable properties thereto. This invention further relates in its simplest form to an alkoxide reaction process which can be described by the following equation:

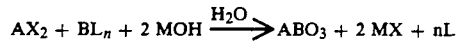

$$AX_2 + BL_n + 2 MOH \xrightarrow{H_2O} ABO_3 + 2 MX + nL$$

where $BL_n$ is an organometallic compound, mixture of organometallic compounds, or other hydrolyzable systems. These compounds can be used neat or as solutions in aqueous acid, in water soluble or water insoluble solvents. "B" can be chosen from cations such as Ti, Zr, Nb, Hf, Zn, etc. "L" can be chosen from several hydrolyzable groups or combination of hydrolyzable groups such as alkoxy, aryloxy, acetoxy, acetoacetonyl, aminoalkyl, chlorides, nitrates and acetates etc., and n is 2, 4, or 5. For the present invention, the alkoxy systems have been preferred. When it is desirable, solid solutions can be formed through the introduction of small amounts of dopants such as Nb, Zn, Nd, etc. They can be combined with the "B" metal alkoxides, for example, as alcoholic solutions of the chlorides or nitrates ($L=Cl^-$ or $NO_3^-$) of the dopants.

According to the process of this invention, the "B" cations, or mixture of "B" cations, in the reaction process are mixed with a solution of "A" cations in a high turbulence energy environment and passed, almost simultaneously, to a receiving vessel (known also as a drownout vessel). The solution of "A" cations can be either aqueous or non-aqueous, and the mixing may be accomplished in the presence of a non-ionic surfactant, such as, for example, an ethoxylated alkylphenol surfactant available under the trademark Igepal® CO-890 from GAF Corporation. The "A" cation solution in the preferred reaction is alkaline, however, the alkalinity may instead be present in the receiving vessel (referred to herein as a "drownout" vessel). The nonionic surfactants are added to aid in the emulsification of the organic "B" cation solution in the aqueous "A" cation solution. "A" can be a cation, such as Ba, Sr, Ca, Mg, Pb, and Nd. Where "A" is Ba or Sr, "X" is generally the hydroxide ($X=OH^-$), and a strong base (MOH), such as, for example, sodium, potassium, or lithium hydroxide ($M=K+$, $Na+$, or $Li+$), may or may not be used. However, when "X" are groups such as chloride, nitrate, or acetate anions, a strong base must also be used, such as, for example, sodium, potassium or lithium hydroxide ($M=K+$, $Na+$ or $Li+$), in order to supply the alkalinity necessary for the reaction.

When "A" is $Mg^{+2}$, $Ca^{+2}$, $Pb^{+2}$ or $Nd^{+3}$, which are metal reactants that have very low solubilities in alkaline, aqueous solutions, an altered procedure must be used in order to bring about the reaction between these "A" cations and "B" cations. These metal systems precipitate rapidly in aqueous solutions of high pH and can produce predominantly amorphous products utilizing the reaction process described in this invention. For example, some salts (acetates, nitrates, chlorides of Mg, Ca, Pb or Nd) which as the case may be would have high enough solubilities, could be dissolved in water. Alkoxides as well as some of the salts (i.e., magnesium nitrate, lead nitrate, neodymium chloride, etc.) can be dissolved in alcoholic solvents. These solutions, which may be aqueous or alcoholic as the case may be and which can be separate or in combination with the "B" cation solutions, can then be mixed in the high turbulence energy environment in the presence (or absence) of a nonionic surfactant. If A and B are combined, their reaction can be brought about by mixing them in the high turbulence energy environment with an aqueous solution of a base such as sodium, potassium or lithium hydroxide. If A and B are separate, they can be mixed in the high turbulence energy environment with the alkalinity being added to the receiving vessel (drownout vessel). The amorphous products produced in this reaction can then be calcined to produce crystalline products, such as $MgTiO_3$ (magnesium titanate), $CaTiO_3$ (calcium titanate), $PbTiO_3$ (lead titanate), and $Nd_2Ti_2O_7$ (neodymium titanate), and mixtures of the same with other $ABO_3$ systems (such as $BaTiO_3$ and $SrTiO_3$).

Figure 2:
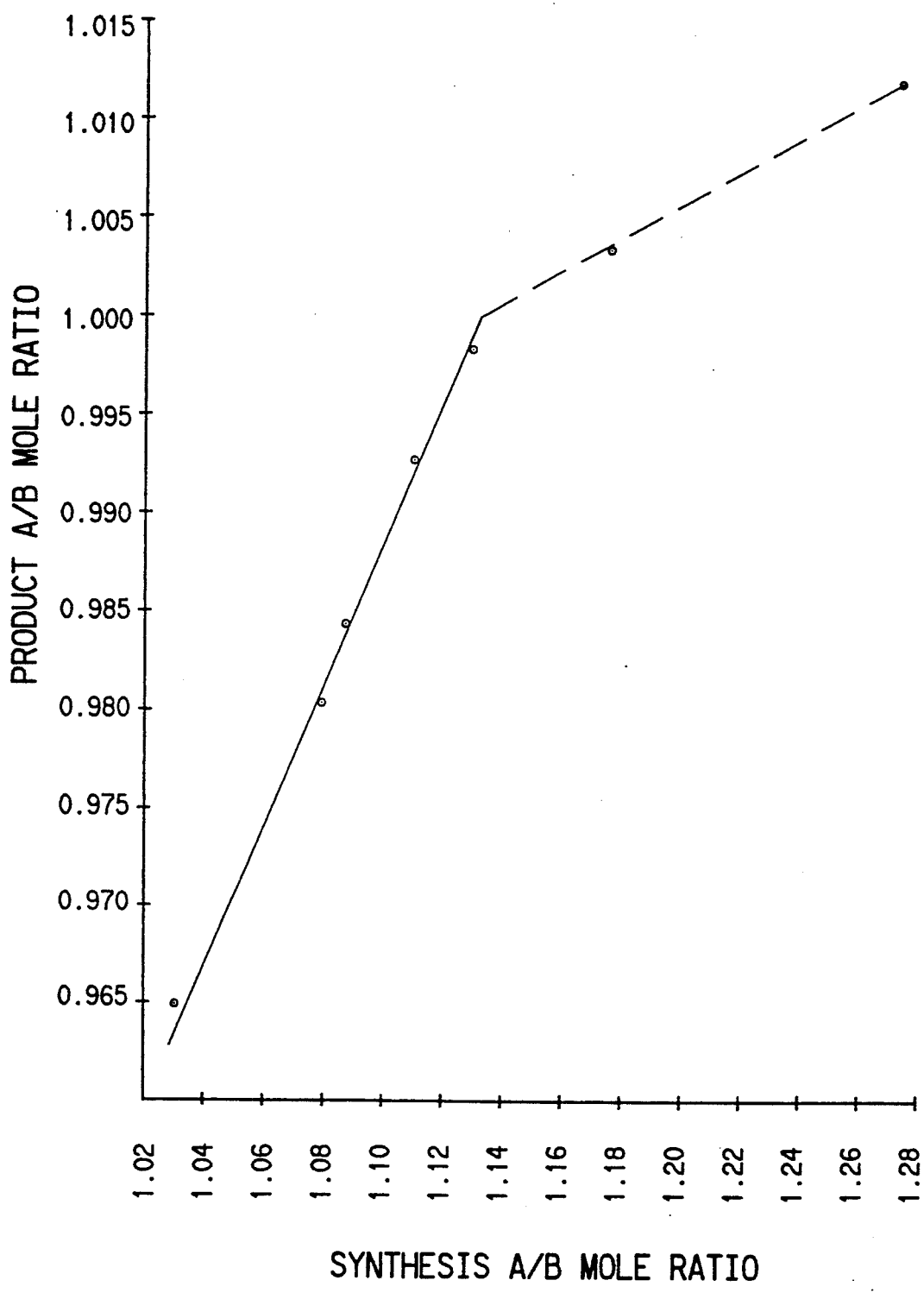
FIG. 2 is a graph which illustrates the relationship of synthesis A/B mole ratio, i.e., the strike ratio, to product A/B mole ratio.

FIG. 1 is a flow diagram for the preparation of barium titanate via one of the embodiments of this invention. In this embodiment, $AX_{y=2}$ is barium hydroxide and $BL_{n=4}$ is tetrabutyl titanate, an organometallic compound manufactured by E. I. du Pont de Nemours and Company and available under the trademark Tyzor ®-TBT. Barium hydroxide octahydrate is dissolved in deionized water from which $CO_2$ has been removed by sparging with nitrogen at about 70° C. for 1 hour. The concentration of barium hydroxide octahydrate is not particularly important to carrying out the process of this invention and is generally between 0.099 and 0.592 g $Ba(OH)_2 \cdot 8H_2O$/ml $H_2($. However, if the concentration of barium hydroxide is varied, the molar excess of barium hydroxide used in the synthesis and the degree of washing of the product for isolation also have to be varied in order to control the A/B mole ratio within the desired range. The A/B mole ratio [moles $Ba(OH)_2 \cdot 8H_2O$ plus moles $Sr(OH)_2 \cdot 8H_2O$ divided by moles of Tyzor ®-TBT] in the synthesis, i.e., the strike A/B mole ratio, must be controlled in order to control the A/B mole ratio in the product powder. Exclusive of strontium, other A cation impurities in the commercial barium hydroxide used for this work were found to be negligible and were not accounted for in calculating A/B mole ratios. A/B mole ratios reported herein were measured using an X-ray fluorescence method, and they are precise to ±0.003 at the 95% confidence limit for a single analysis. The effect of the synthesis (strike) A/B mole ratio on product A/B mole ratio can be seen in FIG. 2.

For a barium hydroxide octahydrate concentration of 0.148 g/ml $H_2O$ it is desirable to control the synthesis A/B mole ratio to 1.08-1.11. The aqueous barium hydroxide solution is heated to a temperature in the range of about 95°-100° C. for 1 hour to complete dissolution. The hot solution can be clarified by filtration through Super Cel (filter aid). The temperatures of the barium hydroxide solution and the Tyzor ®-TBT solution are then adjusted to 80°-85° C. Lower temperatures (less than 80° C.) are also suitable, however they are limited by the solubility of the barium hydroxide octahydrate. Higher temperatures (more than 90° C.) were found to result in a product with lower A/B mole ratios and higher surface areas. An amount in excess of 3% and preferably between 3 and 14% of the total available barium hydroxide solution is pumped into a drownout (receiving) vessel having a predetermined amount of water (sometimes referred to hereinafter as a "heel" of water) and a nonionic surfactant, preferably Igepal ® CO-890. This establishes a proper alkaline environment in the drownout vessel for the reaction. The remainder of the barium hydroxide solution and the Tyzor ®-TBT solution, each at 80°-85° C., are then reacted together by simultaneously and continuously mixing them in a high turbulence energy environment.

In one embodiment of this invention the process is carried out by premixing the nonionic surfactant with the organometallic compound, which will comprise a first ingredient stream, and forming an aqueous solution with the metal hydroxide as a second ingredient stream. The two ingredient streams are then mixed in the high turbulence energy environment in a continuous flow-through manner with a rapid mixing time which produces a reaction product slurry with a uniform composition and a narrow particle size distribution. The desired high turbulence energy environment for mixing the ingredient streams according to the process of this invention can be achieved using a mixing pump, mixing tee or by pumping the ingredient streams through a coaxial jet mixer.

In a preferred embodiment of this invention the organometallic compound ($BL_n$) is tetrabutyl titanate, and the non-ionic surfactant is an ethoxylate alkylphenol surfactant available under the trademark Igepal ® CO-890.

The process of this invention is particularly effective in producing crystalline metal oxides, such as $BaTiO_3$, at a relatively low temperature, normally less than 100° C., having the desired stoichiometry for processing into capacitor bodies, i.e., an A/B mole ratio of the "pure" powder in the range of 0.990-1.010 (the doped powder being slightly higher, e.g., up to about 1.029), and particularly desirable within that range are product powders having A/B mole ratios which are controlled to ±0.003. Control of A/B mole ratio and particle size distribution are important for producing the desired electrical properties in a finished capacitor body.

Figure 3:
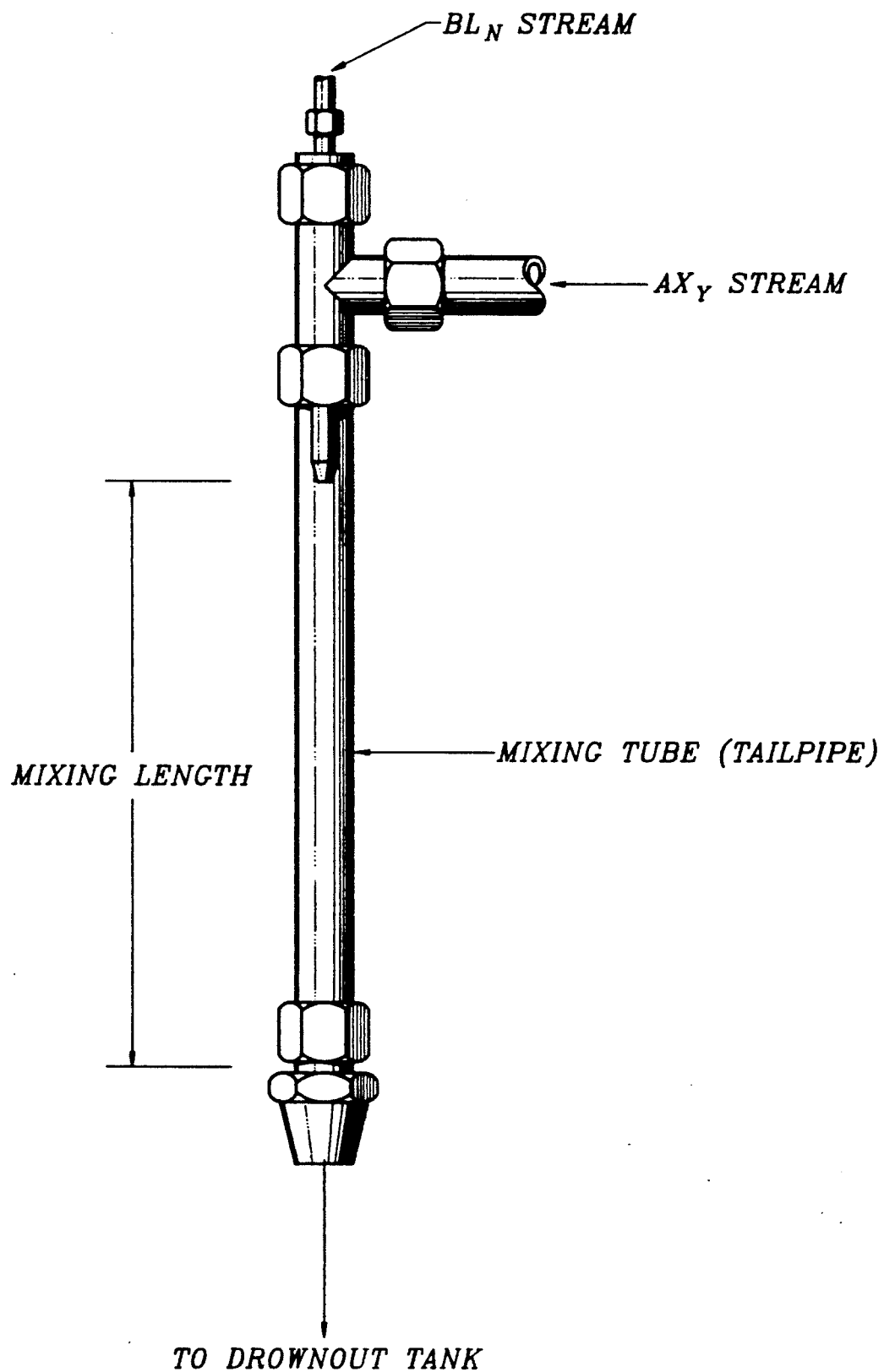
FIG. 3 is an elevational view of a fluid jet mixer which can be used in the process of this invention.
Figure 4A:
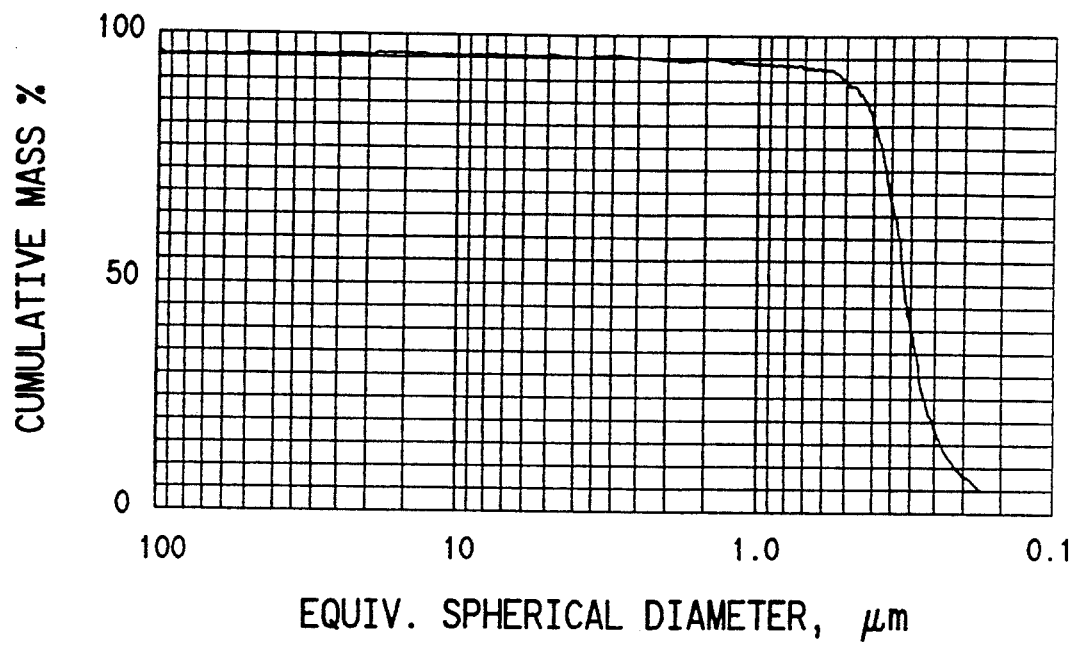
FIGS. 4A and 4B are, respectively, particle size distribution curves for a barium titanate/barium zirconate/barium zinc niobate solid solution (86.7 wt. % $BaTiO_3$/8.7 wt. % $BaZrO_3$/4.6 wt. % $BaZn_{1/3}Nb_{2/3}O_3$) and for barium titanate ($BaTiO_3$) prepared according to the process of this invention.
Figure 4B:
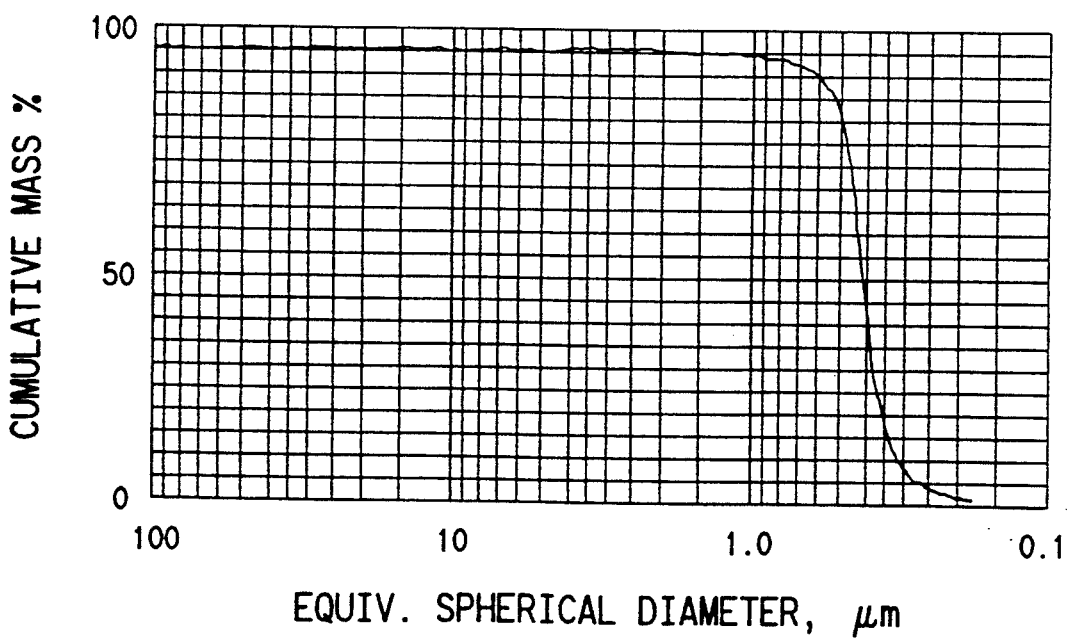
Figure 5A:
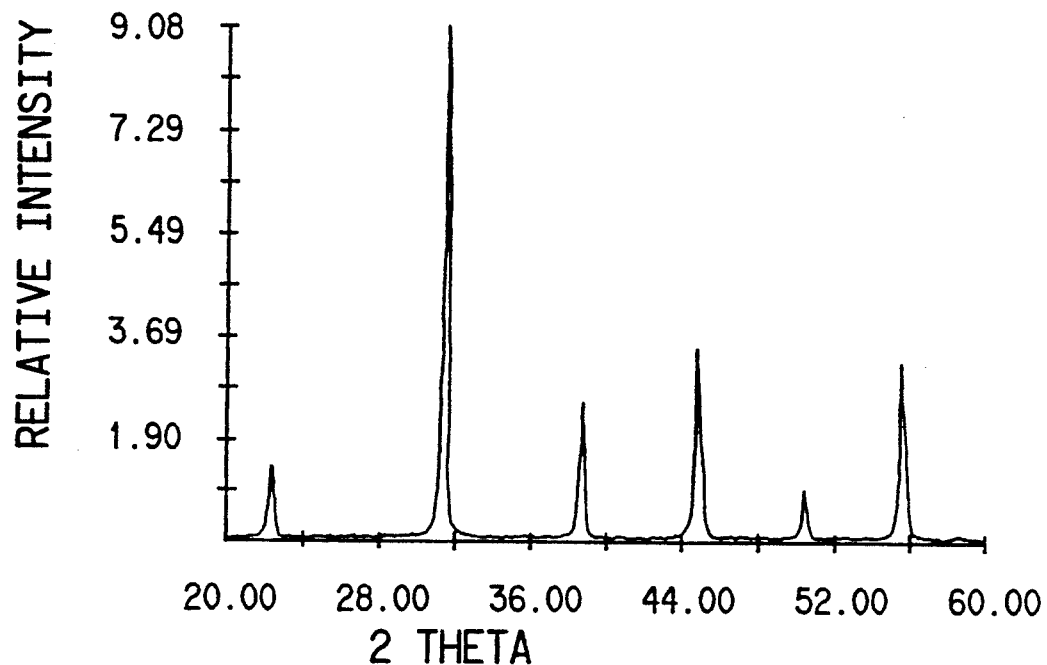
FIGS. 5A and 5B are, respectively, X-ray diffraction patterns for a barium titanate/barium zirconate/barium zinc niobate solid solution (86.7 wt. % $BaTiO_3$/8.7 wt. % $BaZrO_3$/4.6 wt. % $BaZn_{1/3}$, $Nb_{2/3}O_3$) and for barium titanate ($BaTiO_3$) prepared according to the process of this invention.
Figure 5B:
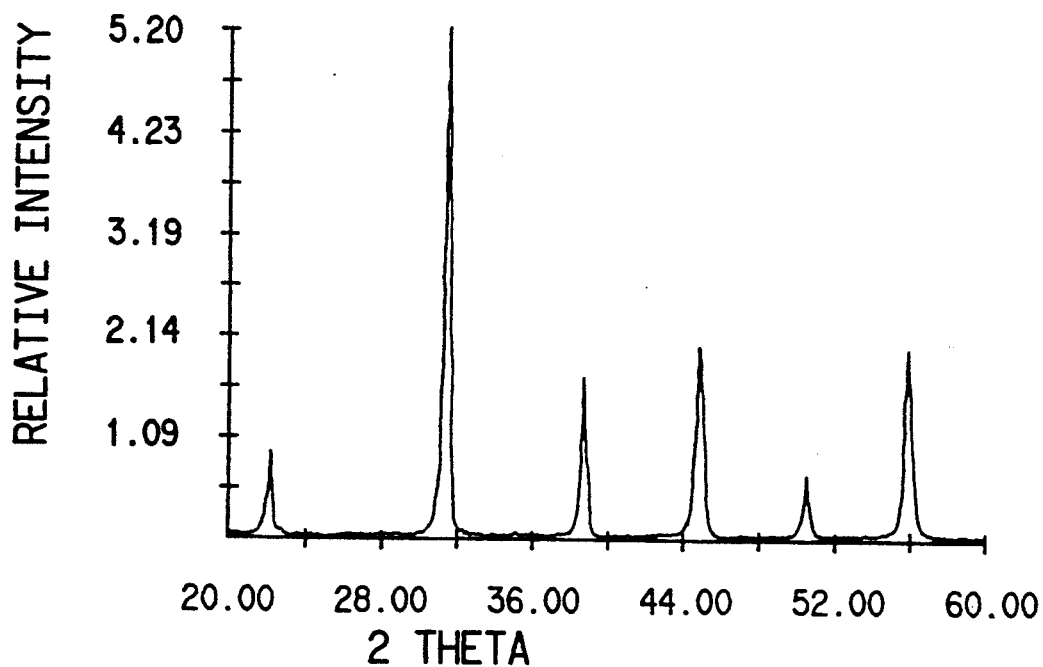

In a preferred embodiment of this invention mixing is accomplished by pumping the ingredient streams simultaneously through a coaxial fluid jet mixer of the type shown in FIG. 3. It will be appreciated by those skilled in the art that, while FIG. 3 shows two ingredient streams, the reaction, i.e., mixing in a high turbulence energy environment, can involve more than two ingredient streams. A high turbulence energy environment, i.e., a high turbulence reaction zone, has been found to be very conducive to obtaining uniform mixed metal oxide compositions with narrow particle size distributions and the desired A/B mole ratio. Mixing time and fluid droplet size are related to energy dissipation per unit mass. To achieve the desired stoichiometry and particle size for the crystalline mixed metal oxides of this invention, a minimum turbulence intensity (T) is required in the reaction zone or region. More particularly, a high turbulence energy environment as employed in this invention is a reaction zone in which a turbulence intensity ("T") is created for the ingredient streams which is greater than about $9 \times 10^6$ cm/sec$^3$ where $$T = \frac{K \times V^3}{D^2}$$

and

K is a dimensionless constant characteristic of the mixing device, about 1.0 for coaxial jet mixers and similar devices;

V is velocity of the combined fluid stream in the tailpipe in cm/sec; and

D is a characteristic dimension of the mixing zone, e.g., the diameter of the tailpipe, in cm.

Once mixing is initiated within the body of the mixing device, i.e., within the reaction zone, for best results the reactants are held together for a minimum residence time to insure that the desired reaction product is obtained. In a preferred embodiment of this invention the jet mixer includes a mixing tube or "tailpipe" of predetermined length as shown in FIG. 3 in which the reactants are held together for a residence time of at least 80 milliseconds.

The reactants, now in the form of a slurry, are discharged into a drownout tank having a predetermined alkaline heel of liquid and equipped with an agitator operating at a minimum tip speed of >400 ft/min. The amount, temperature and the alkalinity of the heel of liquid, which is preferably water, are important to the success of the process.

For optimum results, the initial amount of water present in the drownout tank, i.e., the "heel" of liquid before the reaction, should range from 350–450 ml per mole of B cation and the initial water temperature should be about 20°–40° C., preferably 20°–30° C. In a preferred embodiment of this invention the initial water temperature is about 25° C. Higher temperatures, e.g., 80°–85° C., and lower temperatures, e.g., 5°–10° C., result in a product powder after crystallization and isolation comprised of particles with surface areas (m$^2$/g) higher than desired, e.g., greater than 10 m$^2$/g, and an A/B mole ratio outside the desired range.

In a preferred embodiment of this invention the surfactant is premixed with the organometallic compound which forms one of the ingredient streams. If desired, the surfactant can be added to the drownout tank instead without affecting the reaction.

The reaction product is crystallized by heating the slurry in the drownout tank under reflux at a temperature of about 93° C. while stirring for at least about 6 hours, and up to about 16 hours. Preferably, reflux times will range from 6–12 hours. Reflux times less than 6 hours can result in lower than desirable A/B mole ratios in the product powder.

The resulting crystals can be isolated by cooling the slurry, e.g. to about 25° C., filtering, and washing the product with deionized water. After washing has been completed, the filter cake is dried in a vacuum oven at a temperature in the range of about 80°–100° C. to yield the desired dry powder composition.

A further calcination step at a temperature of up to about 1080° C., typically 1050° C., reduces the surface area of the powders while maintaining a narrow particle size distribution. The combination of low surface area, e.g., about 1.5 to about 2.5 m$^2$/g, and a narrow particle size distribution, e.g., $D_{90} < 4$ μm, can be desirable since it allows the powders to be easily processed into capacitors which exhibit the desired electrical properties.

Generally speaking, the materials of construction for the equipment used in practicing this invention should be selected so as to minimize the opportunity for contaminating the product. The reaction is best carried out in plastic-lined equipment, such as Teflon ® or polypropylene. Metal equipment, such as stainless steel, can also be used. Use of glass equipment, however, can result in unacceptable silica contamination.

The crystalline mixed metal oxide powders produced according to this invention will ordinarily have a surface area of less than 50 m$^2$/g and a particle size parameter ($D_{90}$) of less than 1.0 μm. Surface areas and particle size parameters (e.g. $D_{90}$, $D_{50}$) reported herein were determined by single point B.E.T. and Sedigraph analysis, respectively. Capacitor bodies prepared from such powders by the usual techniques in the industry exhibit a very dense fine grained microstructure along with the most desirable electrical properties.

In developing the process of this invention, it was further recognized that the A/B mole ratio in the synthesis, i.e., the strike ratio, and the alkalinity can be varied independently and can effect the A/B mole ratio of the product as illustrated in Table I.

TABLE I

Effect of Synthesis A/B Mole Ratio and Alkalinity on the A/B Mole Ratio of Barium Titanate

| Sample # | Synthesis A/B Mole Ratio | Moles* KOH | Product A/B | Product S.A. m$^2$/g |
|---|---|---|---|---|
| Control | 1.09 | 0 | 0.996 | 9.1 |
| 1 | 1.07 | 0 | 0.985 | 10.8 |
| 2 | 1.00 | 0.24 | 0.984 | 10.6 |
| 3 | 1.03 | 0.24 | 0.995 | 9.8 |
| 4 | 1.03 | 0.48 | 1.002 | 9.6 |

*Moles of potassium hydroxide per mole of product

The present invention is further illustrated in the following Examples. Strontium, which is normally present in commercially available sources of barium hydroxide in small amounts, e.g., up to about 1.35% by weight or higher, is reported as strontium oxide in the analysis of the product powders in the following Examples.

Some of the tetrabutyl titanate (Tyzor ®-TBT) samples used for the Examples contained small amounts of tetraisopropyl titanate, thus, their purities, when reported as % tetrabutyl titanate, were slightly greater than 100. This accounts for the slight variations in tetrabutyl titanate weight required to deliver 1 mole of titanium.

The powders were evaluated in capacitors by using compositions and procedures described in U.S. Pat. No.

4,640,905, the teachings of which are incorporated herein by reference.

EXAMPLE 1

Preparation of Barium Titanate

Tetrabutyl titanate (Tyzor®-TBT) (338.1 g, 1.0 mole) was charged to a 500 ml flask under a nitrogen atmosphere and warmed to 80°-85° C. Into a 4100 ml polypropylene reactor was charged 2400 ml of deionized water. Carbon dioxide was removed from the water by sparging with nitrogen at about 70° C. for 1 hour. Barium hydroxide octahydrate from Nippon Chemical Co. (348.0 g, about 97.9% $Ba(OH)_2 \cdot 8H_2O$, 1.08 moles) was added to the hot degassed water and the resulting mixture heated at 100° C. for 1 hour to dissolve the barium hydroxide. The hot (about 95° C.) barium hydroxide solution was clarified by filtration. By means of a peristaltic pump an amount (about 6%) of the total available barium hydroxide solution was pumped through the jet mixer in advance of the Tyzor®-TBT. Without interrupting the flow of the hot barium hydroxide solution, the remainder of the barium hydroxide solution was pumped simultaneously with the hot Tyzor®-TBT over about 1 minute through the jet mixer into a 4100 ml polypropylene reactor (drownout vessel) containing 400 ml of deionized water and 10 g Igepal® CO-890, a nonionic surfactant. The drownout vessel was equipped with an 11.5 cm crescent-shaped Teflon® agitator blade, and the agitator speed was set at 445 rpm during the drownout procedure. The turbulence intensity in the jet mixer was about $14 \times 10^6$ $cm/sec^3$. The slurry was heated under reflux (93° C.) for 8 hours. After cooling to about 25° C. the slurry was filtered, and the filter cake was washed with 6½ l of deionized water and dried in a vacuum oven (80°-90° C.) to give 226.5 g (97%) of a white solid which was shown by X-ray diffraction to be crystalline barium titanate. The percent strontium oxide as determined by X-ray fluorescence analysis was 0.62 and the A/B mole ratio was 0.997. The surface area was 8.5 $m^2/g$. The sample particle size distribution determined by the Sedigraph method was $D_{90}$, 0.54 μm; $D_{50}$, 0.42 μm; $D_{10}$, 0.31 μm.

A sample of this powder was calcined at about 950° C. and processed into a Z5U capacitor formulation. The capacitors exhibited excellent insulation resistance, dissipation factor and had an average dielectric constant (K) of about 9400.

EXAMPLE 2

Preparation of Barium Titanate

According to the procedure described in Example 1, 337.1 g (1.0 mole) of hot (80°-85° C.) tetrabutyl titanate (Tyzor®-TBT) was allowed to react with a hot (80°-85° C.) barium hydroxide solution prepared from 356.3 g, about 96.6% $Ba(OH)_2 \cdot 8H_2O$ (1.09 moles) barium hydroxide octahydrate from Kali Chemie Corp. and 1200 ml of deionized water. An amount (about 13%) of the total available barium hydroxide solution was pumped through the jet mixer in advance of the Tyzor®-TBT. Without interrupting the flow of the barium hydroxide solution, the remainder of the barium hydroxide solution was pumped simultaneously with the hot Tyzor®-TBT over about 30 seconds through the jet mixer into 400 ml of deionized water containing 10 g of Igepal® CO-890. The turbulence intensity in the jet mixer was about $27 \times 10^6$ $cm/sec^3$. The slurry was heated under reflux (93° C.) for 8 hours. After cooling to about 25° C. the slurry was filtered, and the filter cake was washed with 6½ l of deionized water and dried in a vacuum oven (80°-90° C.) to give 225.5 g (96.7%) of a white solid which was shown by X-ray diffraction to be crystalline barium titanate. The percent strontium oxide as determined by X-ray fluorescence analysis was 0.27 and the A/B mole ratio was 0.997. The surface area was 11.5 $m^2/g$, and the sample particle size distribution was $D_{50}$, 0.46 μm; $D_{50}$, 0.35 μm; $D_{10}$, 0.25 μm.

A sample of this powder was calcined at about 950° C. and processed into a Z5U capacitor formulation. The capacitors exhibited excellent insulation resistance, dissipation factor and had an average dielectric constant (K) of about 8900.

EXAMPLE 3

Preparation of Barium Titanate

According to the procedure described in Example 1, 340 g (1.0 mole) of hot (80°-85° C.) tetrabutyl titanate (Tyzor®-TBT) was allowed to react with a hot (80°-85° C.) barium hydroxide solution prepared from 356.2 g, about 96.6% $Ba(OH)_2 \cdot 8H_2O$ (1.09 moles) barium hydroxide octahydrate from Kali Chemie Corp. and 2400 ml of deionized water. An amount (about 6%) of the total available barium hydroxide solution was pumped through the jet mixer in advance of the Tyzor®-TBT. Without interrupting the flow of the hot barium hydroxide solution, the remainder of the barium hydroxide solution was pumped simultaneously with the Tyzor®-TBT over about 50 seconds through the jet mixer into 400 ml of deionized water. The turbulence intensity in the jet mixer was about $25 \times 10^6$ $cm/sec^3$. The slurry was heated under reflux (93° C.) for 8 hours. After cooling to about 25° C. the slurry was filtered, and the filter cake was washed with 14 l of deionized water and dried in a vacuum oven (80°-90° C.) to give 224.6 g (96.3%) of a white solid which was shown by X-ray diffraction to be crystalline barium titanate. The percent strontium oxide as determined by X-ray fluorescence analysis was 0.31 and the A/B mole ratio was 0.992. The surface area was 9.1 $m^2/g$, and the sample particle size distribution was $D_{90}$, 0.54 μm; $D_{50}$, 0.41 μm; $D_{10}$, 0.30 μm.

A sample of this powder was calcined at about 950° C. and processed into a Z5U capacitor formulation. The capacitors exhibited good insulation resistance, good dissipation factor and had an average dielectric constant (K) of about 7400.

EXAMPLE 4

Preparation of Barium Titanate

The procedure for this Example was similar to that described in Example 1 except that 340 g (1.0 mole) tetrabutyl titanate (Tyzor®-TBT) and 10 g of Igepal® CO-890 were charged to a 500 ml flask under a nitrogen atmosphere and heated at 80°-85° C. for about 3 hours. A hot (80°-85° C.) barium hydroxide solution was prepared from 356.2 g, about 96.6% $Ba(OH)_2 \cdot 8H_2O$ (1.09 moles) barium hydroxide octahydrate from Kali Chemie Corp. and 2400 ml of deionized water. An amount (about 6%) of the total available barium hydroxide solution was pumped through the jet mixer in advance of the Tyzor®-TBT/Igepal® CO-890 reaction mixture. Without interrupting the flow of the hot barium hydroxide solution, the remainder of the barium hydroxide solution was pumped simultaneously with the Tyzor®-TBT/Igepal® CO-890 reaction mixture over about 1 minute through the jet mixer into 400 ml of deionized water. The turbulence intensity in the jet mixer was about $14 \times 10^6$ cm/sec$^3$. The slurry was heated under reflux (93° C.) for 8 hours. After cooling to about 25° C. the slurry was filtered, and the filter cake was washed with 19 l of deionized water and dried to give 226.8 9 (97.2%) of a white solid which was shown by X-ray diffraction to be crystalline barium titanate. The percent strontium oxide as determined by X-ray fluorescence analysis was 0.31 and the A/B mole ratio was 0.995. The surface area was 9.2 m$^2$/g, and the sample particle size distribution was $D_{90}$, 0.50 μm; $D_{50}$, 0.38 μm; $D_{10}$, 0.2 μm.

A sample of this powder was calcined at about 950° C. and processed into a Z5U capacitor formulation. The capacitors exhibited excellent insulation resistance, excellent dissipation factor and had an average dielectric constant (K) of about 8600.

EXAMPLE 5

Preparation of Barium Titanate

According to the procedure described in Example 1, 337.1 g (1.0 mole) of hot (80°-85° C.) tetrabutyl titanate (Tyzor®-TBT) was allowed to react with a hot (80°-85° C.) barium hydroxide solution prepared from 290.7 g (1.19 moles) barium chloride dihydrate from Sachtleben Chemi, 97.5 g, about 98.5% NaOH (2.4 moles) sodium hydroxide and 2200 ml of deionized water. An amount (about 6%) of the total available barium hydroxide solution was pumped through the jet mixer in advance of the Tyzor®-TBT. Without interrupting the flow of the hot barium hydroxide solution, the remainder of the barium hydroxide solution was pumped simultaneously with the Tyzor®-TBT over about 1 minute through the jet mixer into 400 ml of deionized water containing 10 g of Igepal® CO-890. The turbulence intensity in the jet mixer was about $12 \times 10^6$ cm/sec$^3$. The slurry was heated under reflux (93° C.) for 8 hours. After cooling to about 25° C. the slurry was filtered, and the filter cake was washed with 26 l of deionized water and dried in a vacuum oven (80°-90° C.) to give 227.3 g (97.5%) of a white solid which was shown by X-ray diffraction to be crystalline barium titanate. The percent strontium oxide as determined by X-ray fluorescence analysis was 0.052 and the A/B mole ratio was 0.999. The surface area was 12.8 m$^2$/g, and the particle size distribution was $D_{90}$, 0.50 μm; $D_{50}$, 0.37 μm; $D_{10}$, 0.25 μm.

EXAMPLE 6

Preparation of a Barium Titanate/Barium Zirconate Solid Solution

The procedure for this Example was similar to that described in Example 1 except that 313.9 g (0.923 mole) tetrabutyl titanate (Tyzor®-TBT), 36.0 g (0.0768 mole) of n-propyl zirconate from Kay-Fries Inc. and 10 g of Igepal® CO-890 were charged to a 500 ml flask under a nitrogen atmosphere and heated at 80°-85° C. for about 3 hours. A hot (80°-85° C.) barium hydroxide solution was prepared from 378.6 g (1.2 moles) barium hydroxide octahydrate from J. T. Baker Co. and 2400 ml of deionized water. An amount (about 6%) of the total available barium hydroxide solution was pumped through the jet mixer in advance of the Tyzor®-TBT/n-propyl zirconate/Igepal® CO-890 mixture. Without interrupting the flow of the ho barium hydroxide solution, the remainder of the barium hydroxide solution was pumped simultaneously with the hot Tyzor®-TBT/n-propyl zirconate/Igepal® CO-890 reaction mixture over about 1 minute through the jet mixer into 400 ml of deionized water. The turbulence intensity in the jet mixer was about $15 \times 10^6$ cm/sec$^3$. The slurry was heated under reflux (92° C.) for 8 hours. After cooling to about 25° C. the slurry was filtered, and the filter cake was washed with 18 l of deionized water and dried to give 229.2 g (96.9%) of a white solid which was shown by X-ray diffraction and X-ray fluorescence analysis to be a crystalline solid solution of barium titanate and barium zirconate. X-ray fluorescence analysis for 91 wt. % BaTiO$_3$/9.0 wt. % BaZrO$_3$ calcd: % BaO, 64.81; % TiO$_2$ 31.17; % ZrO$_2$, 4.00. Found: % BaO, 63.31; % TiO$_2$ 30.52; % ZrO$_2$ 5.72; % SrO, 0.16. The surface area was 7.5 m$^2$/g, and the particle size distribution was $D_{90}$, 0.49 μm; $D_{50}$, 0.37 μm; $D_{10}$, 0.23 μm.

A sample of the powder was processed into capacitors which exhibited excellent electrical properties.

EXAMPLE 7

Preparation of a Barium Titanate/Barium Zirconate/Barium Zinc Niobate Solid Solution The procedure for this Example was similar to that described in Example 1 except that 1.85 g (0.01354 mole) of anhydrous zinc chloride from Alfa Corp. and 7.39 g (0.02707 mole) of niobium (V) chloride (99% NbCl$_5$) from Alfa Corp. were dissolved in a solution of 33.6 g (0.07462 mole) zirconium n-propoxide (about 20.3% Zr) from Alfa Corp. and 20 ml of absolute ethanol in a 500 ml flask under a nitrogen atmosphere. To this solution was added 299.1 g (0.8848 mole tetrabutyl titanate Tyzor®-TBT) and the resulting solution heated at 80°-85° C. for about 2 hours. A hot (80°-85° C.) barium hydroxide solution was prepared from 346.8 g, 96.6% Ba(OH)$_2$·8H$_2$O (1.06 moles) of barium hydroxide octahydrate from Kali Chemie Corp., 15.7 g (0.244 mole) potassium hydroxide (87.2% KOH) from J. T. Baker Co. and 2400 ml of deionized water. An amount (about 6%) of the total available barium hydroxide solution was pumped through the jet mixer in advance of the Tyzor®-TBT/n-propyl zirconate/zinc chloride/niobium (V) chloride solution. Without interrupting the flow of the hot barium hydroxide solution, the remainder of the barium hydroxide solution was pumped simultaneously with the Tyzor®-TBT/n-propyl zirconate/zinc chloride/niobium (V) chloride solution over about 1 minute through the jet mixer into 400 ml of deionized water containing 10 g of Igepal® CO-890. The turbulence intensity in the jet mixer was about $15 \times 10^6$ cm/sec$^3$. The slurry was heated under reflux (92° C.) for 8 hours. After cooling to about 25° C. the slurry was filtered, and the filter cake was washed with 8 l of deionized water and dried to give 233 g (97.9%) of a white solid which was shown by X-ray diffraction and X-ray fluorescence analysis to be a crystalline solid solution of barium titanate, barium zirconate and barium zinc niobate. X-ray fluorescence analysis for 86.7 wt. % BaTiO$_3$/8.7 wt. % BaZrO$_3$ 4.6 wt. % BaZn$_{1/3}$Nb$_{2/3}$O$_3$, Calcd: % BaO, 64.44; TiO$_2$ 29.71; % ZrO$_2$, 3.86; % Nb$_2$O$_5$, 1.51; % ZnO, 0.463. Found: % BaO, 63.20, % TiO$_2$ 29.50; % ZrO$_2$ 3.83; % Nb$_2$O$_5$, 1.52; % ZnO, 0.458, % SrO, 0.29. The surface area was 14.0 m²/g, and the particle size distribution was D₉₀, 0.43 μm; D₅₀, 0.32 μm; D₁₀, 0.21 μm.

A sample of the powder was processed into capacitors which exhibited excellent electrical properties.

EXAMPLE 8

Example Preparation of Barium Titanate

Tetraisopropyl titanate (Tyzor®-TPT) (287 g, 0.97 mole) was charged to a 500 ml flask under a nitrogen atmosphere at room temperature (24° C.). Barium acetate (268 g, 1.05 moles) and 2000 ml of deionized water was charged to a 4100 ml polypropylene reactor under nitrogen atmosphere at room temperature (24° C.). Into another 4100 ml polypropylene reactor 800 ml of deionized water, 229 g of sodium hydroxide (98.6%, 5.7 moles), and 10 g of Igepal® CO-890 was charged also under a nitrogen atmosphere at room temperature. By means of peristalic pumps the Tyzor®-TPT solution and the barium acetate solution were fed (over approximately 1 minute) through a jet mixer into the sodium hydroxide/Igepal® CO-890 solution (drownout vessel). The turbulence intensity in the jet mixer was about $10 \times 10^6$ cm/sec³. The reaction was exothermic resulting in a temperature increase to 34° C. The drownout solution, now in the form of a slurry, was continuously agitated (about 450 rpm) with a Teflon® agitator and maintained under a nitrogen atmosphere. After 1 hour in the drownout vessel, the slurry (which was at 30° C., and pH=10.5) was heated to a temperature of 83°-86° C. and maintained for 7 more hours. After cooling to room temperature the slurry was filtered, and the filter cake was washed with 7 l of deionized and subsequently dried in a vacuum oven (80°-90° C.) to give 236.4 g (about 100%) of a white solid which was shown by X-ray diffraction analysis to be crystalline barium titanate with an average crystalline size of approximately 500 A, a surface area of 17.2 m²/g, and a SrO content of 0.065% (wt./wt.). The A/B mole ratio of this product was 1.029.

EXAMPLE 9

Example Preparation of Strontium Titanate

Tetrabutyl titanate (Tyzor®-TBT) (338 g, 1.0 mole) was charged to a 500 ml flask under a nitrogen atmosphere. The solution was warmed to 80°-85° C. Strontium hydroxide octahydrate (274 g, approximately 101.3% Sr(OH)₂·8H₂O, 1.04 moles) was charged to a 4100 ml polypropylene reactor containing 2400 ml of deionized water under a nitrogen atmosphere at 90°-95° C. Into another 4100 ml polypropylene reactor 400 ml of deionized water and 10 g of Igepal® CO-890 was charged also under a nitrogen atmosphere at room temperature (about 25° C.). By means of peristaltic pumps the Tyzor®-TBT solution and strontium hydroxide solution were fed (over approximately 1 minute) through a jet mixer into the Igepal® CO-890 solution (drownout vessel). The turbulence intensity in the jet mixer was about $16 \times 10^6$ c/sec³. The drownout solution, now in the form of a slurry, was continuously agitated (about 450 rpm) with a Teflon® agitator and heated (90°-95° C.) for 8 hours under a nitrogen atmosphere. After cooling to room temperature the slurry was filtered, and the filter cake was washed with 4 l of deionized water and subsequently dried in a vacuum oven (80-90° C.) to give 176.3 g (about 96%) of white solid which was shown by X-ray diffraction analysis to be crystalline strontium titanate with an average crystal size of 500 A. The A/B mole ratio of this product was 1.025.

EXAMPLE 10

The sample of the barium titanate powder prepared according to the procedure described in Example 1 was calcined at a temperature of 1020° C. The surface area was 2.1 m²/g and the particle size distribution was D₉₀ 2.45 μm; D₅₀ 0.92 μm; D₁₀ 0.42 μ.

A sample of the calc powder was easily processed into a capacitor and exhibited excellent electrical properties.

What is claimed is:

1. A process for preparing crystalline mixed metal oxides having an A/B ratio of from about 0.990 to about 1.029 of the formula:

$$ABO_3$$

wherein,

A is a metal cation selected from Ba, Sr, Ca, Mg, Pb and Nd and mixtures thereof; and B is a metal cation selected from Ti, Zr, Nb, Hf, Zn and Sn and mixtures thereof which comprises the steps of:
  (a) simultaneously and continuously mixing an organometallic compound, or mixture of organometallic compounds or a hydrolyzable system, of the structure $BL_n$, where B is as defined above, L is a hydrolyzable group, or a combination of such groups, selected from the group consisting of an alkoxy, aryloxy, aminoalkyl, acetoxy, acetoacetonyl, a chloride, a nitrate and an acetate and n is 2 or 4 with a solution of a compound, or a mixture of compounds, of the general structure $AX_y$, where A is as defined above, X is an anion, or combination of anions, selected from the group consisting of hydroxide, chloride, nitrate and acetate, and y is 2 or 3 in an alkaline, high turbulence energy environment of a coaxial jet mixer; wherein said environment is characterized by a turbulence intensity of greater than about $14 \times 10^6$ cm/sec³;
  (b) crystallizing a reaction product; and
  (c) recovering the crystals, wherein 90% of the particles have a particle size between 0.2 and 1.0 micron and have a surface area of less than about 50 m²/g.

2. The process of claim 1, further including,
  (d) calcining the crystals up to about 1080° C.

3. The process of claim 1 wherein the solution of A cations is an aqueous solution.

4. The process of claim 1 wherein the solution of A cations is a non-aqueous solution.

5. The process of claim 1, 2, 3 or 4 in which the organometallic compounds $BL_n$ are premixed with a nonionic surfactant to form a first ingredient stream which is reacted with the solution of compounds $AX_y$ as a second ingredient stream by mixing said streams simultaneously and continuously in a high turbulence energy environment.

6. The process of claim 5 wherein said mixing comprises pumping said ingredient streams simultaneously through a coaxial jet mixer.

7. The process of claim 5 wherein said organometallic compound $BL_n$ is tetrabutyl titanate and said surfactant is an ethoxylated alkylphenol.

8. The process of claim 1 wherein the crystalline mixed metal oxide is a solid solution of barium titanate, barium zirconate and barium zinc niobate; the hydrolyzable system is a mixture comprising anhydrous zinc chloride, niobium (V) chloride, zirconium-propoxide and tetrabutyl titanate, and the alkaline earth metal hydroxide is barium hydroxide.

9. The process of claim 2 wherein the calcined crystals have a low surface area in the range of about 1.5 to about 2.5 m$^2$/g while maintaining a narrow particle size distribution (D$_{90}$) of less than about 4.0 μm.

10. A process for preparing crystalline barium titanate which comprises the steps of:
(a) reacting tetrabutyl titanate as a first ingredient stream with a solution of barium hydroxide as a second ingredient stream at a temperature of 80°–85° C. in a high turbulence energy environment comprising pumping said ingredient streams simultaneously and continuously through a coaxial jet mixer, said environment characterized by a turbulence intensity greater than about 14×10$^6$ cm/sec$^3$ to form a slurry and discharging said slurry into an alkaline heel of water;
(b) crystallizing said slurry by heating under reflux with continuous agitation for at least about 6 hours to no more than 48 hours; and
(c) recovering crystalline barium titanate having 90% of the particles greater than 0.2 um in size up to about 1.0 μm in size, and a surface area of less than about 50 m$^2$/g.

11. The process of claim 10, further including,
(d) calcining the crystals at 1050° C.

12. The process of claim 11 wherein the calcined crystals have a low surface area in the range of about 1.5 to about 2.5 m$^2$/g while maintaining a narrow particle size distribution (D$_{90}$) of less than about 4.0 μm.

13. A chemically homogeneous crystalline mixed metal oxide having an A/B ratio in the range of about 0.990 to about 1.029 of the formula:

$ABO_3$ wherein,
A is a metal cation selected from Ba, Sr, Ca, Mg, Pb, Nd and mixtures thereof; and
B is a metal cation selected from Ti, Zr, Nb, Hf, Zn, Sn and mixtures thereof which comprises the steps of:
(a) simultaneously and continuously mixing an organometallic compound, or mixture of organometallic compounds, of the general structure BL$_n$ where B is as defined above, L is a hydrolyzable group, or combination of such groups, selected from the group consisting of an alkoxy, aryloxy, aminoalkyl, acetoxy, and acetoacetonyl, and n is 2, 4, or 5 as a first ingredient stream with a solution of a compound, or a mixture of compounds, of the general structure AXy, where A is as defined above, X is an anion, or a combination of anions, selected from the group consisting of a hydroxide, chloride, nitrate and an acetate, and y is 2 or 3 in an alkaline, high turbulence energy environment comprising pumping said ingredient streams simultaneously and continuously through a coaxial jet mixer which produces a turbulence intensity greater than about 14×10$^6$ cm/sec$^3$;
(b) crystallizing a reaction product for at least 6 hours to no more than 48 hours; and
(c) recovering the crystals, wherein 90% of the crystalline mixed metal oxide is greater than 0.2 μm in size up to about 1.0 μm in size, and a surface area of less than about 50 m$^2$/g.

14. The crystalline mixed metal oxide of claim 13 which is barium titanate or strontium titanate.

15. The crystalline mixed metal oxide of claim 14 which is doped with one or more ions selected from Nd, Nb, Zn and Zr.

16. The crystalline mixed metal oxide of claim 13 which is a solid solution of barium titanate, barium zirconate and barium zinc niobate.

* * * * *